(12) United States Patent
Thal et al.

(10) Patent No.: US 7,117,635 B2
(45) Date of Patent: Oct. 10, 2006

(54) TRAPPING PROTECTOR FOR A POWER-OPERATED CLOSING DEVICE

(75) Inventors: Andreas Thal, Dornbirn (AT); Johann Hertel, Neuried (DE); Knut Hofmann, Wangen (DE)

(73) Assignee: Metzeler Automotive Profile, Lindau (DE)

( * ) Notice: Subject to any disclaimer, the term of this patent is extended or adjusted under 35 U.S.C. 154(b) by 0 days.

(21) Appl. No.: 10/216,499

(22) Filed: Aug. 9, 2002

(65) Prior Publication Data

US 2003/0042766 A1   Mar. 6, 2003

Related U.S. Application Data

(63) Continuation of application No. 09/762,816, filed as application No. PCT/EP00/02634 on Mar. 24, 2000, now abandoned.

(30) Foreign Application Priority Data

Mar. 26, 1999   (DE) ................. 199 13 879

(51) Int. Cl.
*E05F 15/02*   (2006.01)
(52) U.S. Cl. ................. 49/28; 49/26; 296/223
(58) Field of Classification Search ............. 49/26, 49/27, 28; 296/223; 200/61.43
See application file for complete search history.

(56) References Cited

U.S. PATENT DOCUMENTS

| | | | |
|---|---|---|---|
| 5,459,962 A | * | 10/1995 | Bonne et al. ............ 49/28 |
| 5,592,060 A | * | 1/1997 | Racine et al. ............ 318/469 |
| 6,076,886 A | * | 6/2000 | Petri et al. ............ 296/216.09 |
| 6,233,872 B1 | | 5/2001 | Glagow et al. |
| 6,389,752 B1 | * | 5/2002 | Rosenau ............ 49/28 |
| 6,463,698 B1 | * | 10/2002 | Hofmann ............ 49/28 |

FOREIGN PATENT DOCUMENTS

| | | |
|---|---|---|
| DE | 9317291.5 U | 12/1994 |
| DE | 19602744 A1 | 7/1997 |
| DE | 19701412 A1 | 7/1998 |
| EP | 0728893 A1 | 8/1996 |
| EP | 0870892 A2 | 10/1998 |
| JP | 222923 | * 9/1988 ............ 296/223 |

OTHER PUBLICATIONS

Scherraus et al., English Abstract of patent document No. DE 19602744 A1, filed Jan. 26, 1996, published Jul. 24, 1997.
Reinhardt et al., English Abstract of patent document No. DE 19701412 A1, filed Jan. 17, 1997, published on Jul. 23, 1998.
Lehnen et al., English Abstract of patent document No. EP 0870 892 A2, filed on Mar. 26, 1998, published on Oct. 14, 1998.
Pennerath, Eddy, English Abstract of patent document No. EP 0728893 A1, filed on Jan. 15, 1996, published on Aug. 28, 1996.

* cited by examiner

*Primary Examiner*—Jerry Redman
(74) *Attorney, Agent, or Firm*—Stephen B. Salai, Esq.; Brian B. Shaw, Esq.; Harter, Secrest & Emery LLP

(57) ABSTRACT

The invention relates to a trapping protector (1) including a hollow profile (12) for a power-operated closing device, more particularly for a motor vehicle sunroof. The hollow profile (12) is provided at at least one of its ends (14) with an appendage (21) of less thickness than the hollow profile (12). Due to the ends (14); 15) of the hollow profile (12) overlapping a trapping protector on all sides is achieved.

12 Claims, 1 Drawing Sheet

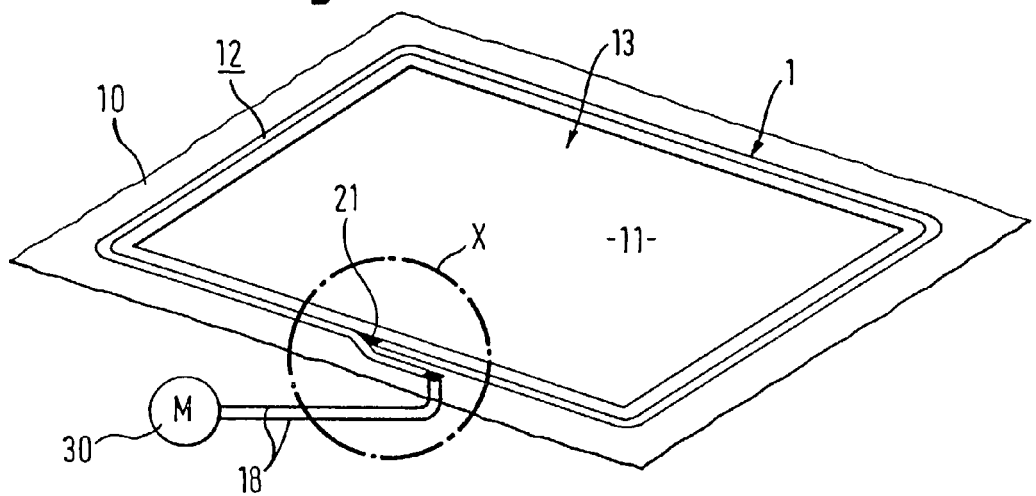
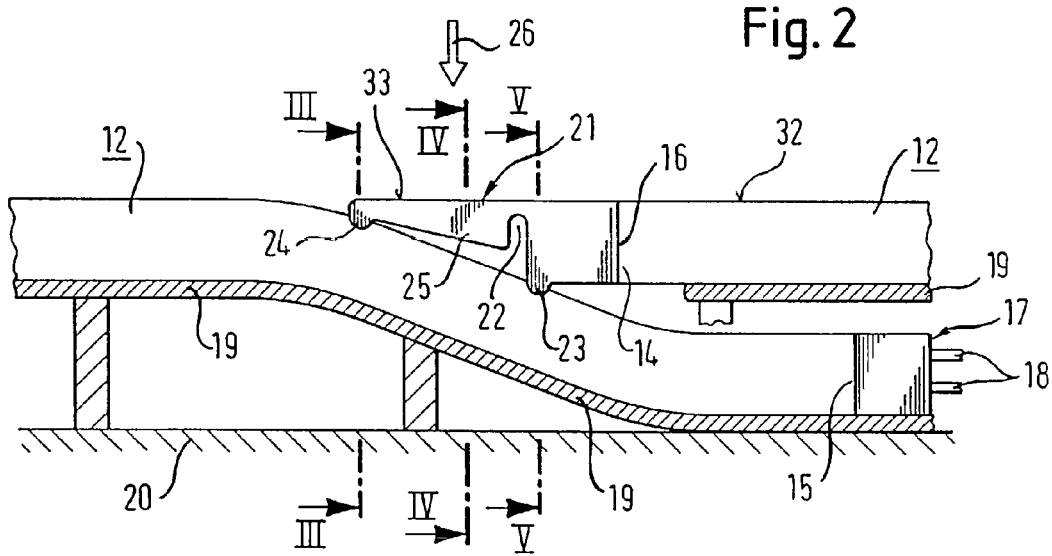
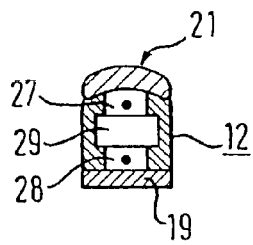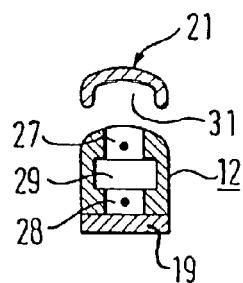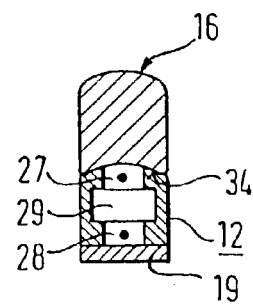

TRAPPING PROTECTOR FOR A POWER-OPERATED CLOSING DEVICE

The present application is a continuation of U.S. Ser. No. 09/762,816, now abandoned, filed Mar. 24, 2000 which claims priority to PCT/EP00/02634 filed Mar. 24, 2000, which in turn claims priority to DE 199 13 879.6 filed Mar. 26, 1999.

BACKGROUND OF THE INVENTION

Field of the Invention

The present invention relates to a trapping protector for a power-operated closing device, more particularly for a motor vehicle sunroof, including an elastomer hollow profile comprising at least two electrical conductive portions spaced away from each other whose contact triggers a switching action of a drive assembly of the closing device.

One such trapping protector is known from DE 197 20 713 C1 assigned to the same applicant. Provided at both ends of the known trapping protector are moldings in which the necessary electric terminals as well as a checking system are accommodated. The checking system serves for checking proper functioning of the trapping protector and is generally configured as a terminating resistor. The disadvantage of this known trapping protector is that in the region of the moldings no trapping protector function is provided. Achieving a trapping protector function on all sides along its whole length is thus not achievable.

The objective of the present invention is thus to provide a trapping protector assuring a trapping protector function on all sides by simple means.

In accordance with the invention this objective is achieved in a trapping protector of the aforementioned kind in that the hollow profile is provided at at least one of its ends with an appendage of less cross-sectional thickness than the hollow profile.

BRIEF SUMMARY OF THE INVENTION

The trapping protector in accordance with the invention is arranged such that the ends of the hollow profile overlap and the appendage provided at the one end rests on the hollow profile spaced away from the other end. The appendage of less cross-sectional thickness than the hollow profile permits overlapping of the two ends. In the overlapping portion the two ends are staggered relative to each other. When an object becomes trapped in the overlapping portion the upper end and/or the appendage are moved and deform the hollow profile located therebelow, activating the desired contact for signaling the drive assembly of the closure means. The reduced thickness of the elongation permits a smooth transition between the upper end and the hollow profile.

Advantageous aspects and further embodiments of the invention read from the dependent claims.

In one advantageous aspect the appendage is tapered as of the assigned end of the hollow profile. It is due to this taper that adapting to the hollow profile is achieved on which the appendage rests in the arrangement in accordance with the invention.

In accordance with one advantageous further embodiment the upper side of the appendage is flush with the upper side of the hollow profile to thus achieve a substantially totally smooth transition, pleasing in appearance.

Advantageously, the appendage is connected to the assigned end of the hollow profile via a design kink location of reduced flexibility. The design kink location permits making use of a relatively stiff appendage which in a trapping situation is pivoted opposite the assigned end to deform the hollow profile.

In another advantageous further embodiment the appendage is arranged on one face of the hollow profile, this permitting an overlap of ends in a straight portion of the trapping protector. As an alternative the appendage may be arranged on the side of the hollow profile so that an overlap is achievable in a corner portion.

In a further advantageous aspect the appendage comprises at its end facing away from the hollow profile a thickened portion. This thickened portion increases the contact surface area between the end of the appendage and the hollow profile to thus prevent damage whilst enhancing the weatherseal in the overlap portion.

In yet another advantageous further embodiment the appendage is configured cross-sectionally substantially curved to thus permit achieving adaptation to the surface of the hollow profile whilst enhancing the stiffness of the appendage despite its low weight.

To advantage the end of the hollow profile provided with the appendage comprises a thickened portion serving to support the hollow profile portion located therebelow in the arrangement in accordance with the invention. The contact surface area is increased to thus prevent damage of the hollow profile whilst improving the weatherseal. At the same time a defined contact surface area is provided.

In accordance with yet another advantage aspect the thickened portion comprises a contact surface area adapted to the upper side of the hollow profile. The adapted contact surface area provides a defined contact surface area between the thickened portion and the hollow profile.

In the arrangement in accordance with the invention it is provided for in another advantageous further embodiment that the thickened portion of the end of the hollow profile provided with the appendage rests by its contact surface area on the hollow profile spaced away from the other end to thus ensure that the hollow profile provides a trapping protector function on all sides. At the same time the length can be compensated by the spacing between the two ends of the hollow profile and thus the overlap portion is suitably increased or reduced depending on the circumstances. As an alternative or in addition thereto the lower end of the hollow profile may be introduced into a recess to thus achieve compensating the length.

Advantageously the appendage with its thickened portion rests on the hollow profile, resulting in the contact surface area being increased to thus avoid damage of the hollow profile whilst enhancing the weatherseal.

In still another advantageous aspect a gap is formed between the appendage and the hollow profile in the middle portion of the appendage. In this case the appendage then rests on the hollow profile only by its thickened portion. Accordingly, in a trapping situation only a small portion of the hollow profile is deformed. For deforming such a small portion only slight forces are needed, i.e. the trapping protector in accordance with the invention responds even to small trapping forces in the arrangement in accordance with the invention so that injuries due to trapping are reliably excluded.

BRIEF DESCRIPTION OF THE SEVERAL VIEWS OF THE DRAWING(S)

The invention will now be detailed by way of example embodiments with reference to the drawing in which:

FIG. 1 is a schematic view in perspective of a roof aperture including a roof opening;

FIG. 2 is a section view of the magnified detail X taken from FIG. 1;

FIG. 3 is a section view take along the line III—III in FIG. 2,

FIG. 4 is a section view take along the line IV—IV in FIG. 2, and

FIG. 5 is a section view take along the line VVI in FIG. 2.

DETAILED DESCRIPTION OF THE INVENTION

Referring now to FIG. 1 there is illustrated schematically a roof aperture 10 including a roof opening 11 in perspective. The roof opening 11 is surrounded by a trapping protector 1 on all sides comprising a hollow profile 12. To close off the roof opening 11 a sunroof 13 is employed. In a trapping situation the hollow profile 12 is deformed, resulting in a switching action being activated which is communicated to the drive assembly 30 for the sunroof 13 via the terminals 18. Depending on how it is preset the sunroof 13 is either halted or reversed. The ends 14, 15 of the hollow profile 12 overlap each other.

Referring now to FIG. 2 there is illustrated a longitudinal section through the overlap portion of the hollow profile 12. FIGS. 3 to 5 show cross-sections through the overlap portion.

At both ends 14, 15 of the hollow profile 12 moldings 16, 17 are formed. Integrated in the molding 16 is a function-checking system (not shown). The terminals 18 are accommodated in the molding 17. The hollow profile 12 rests on a support 19, which in turn is supported by a base 20.

To provide a trapping protector on all sides the ends 14, 15 of the hollow profile 12 overlap. Provided at the face of the upper end 14 is an appendage 21 less thick in cross-section than the hollow profile 12. The appendage 21 is tapered as of the ends 14 of the hollow profile 12 to thus achieve a smooth transition between the lower end 15 and the upper end 14 of the hollow profile 12. In this arrangement the upper side 33 of the appendage 21 is flush with the upper side 32 of the hollow profile 12 so that a substantially smooth surface is formed to thus achieve a pleasing overall appearance.

The appendage 21 is connected to the end 14 of the hollow profile 12 via a design kink location 22 of increased flexibility. When a force materializes in the direction of the arrow 26 the appendage 21 is thus able to pivot opposite the end 14, the appendage 21 thereby resting by its thickened portion 24 on its end facing away from the hollow profile 12. In the middle portion 25 of the appendage 21 a gap 31 is formed between the appendage 21 and the hollow profile 12. The appendage 21 thus contacts the hollow profile 12 only by the thickened portion 24 to thus achieve a small contact surface area which activates the trapping protector function as soon as a small force is applied in the direction of the arrow 26.

The upper end 14 of the hollow profile 12 at which the appendage 21 is arranged comprises a thickened portion 23. This thickened portion 23 rests by its contact surface area 34 on the hollow profile spaced away from the other end 15. The contact surface area 34 in this case is adapted to the upper side 32 of the hollow profile 12 so that damage is avoided and speedy activation is achieved.

In a trapping situation outside of the overlap portion the hollow profile 12 is deformed so that electrically conductive portions 27, 28 spaced away from each other by the gap 31 come into contact with each other, resulting in the switching action for signaling the drive assembly 30 for the sunroof 13. In the overlap portion the appendage 21 is pivoted opposite the upper end 14 of the hollow profile 12, the thickened portion 24 thereby deforming the hollow profile 12 to again bring the two portions 27, 28 in contact with each other and activate the switching action. When a trapping situation occurs in the portion of the moldings 16 it deforms the hollow profile 12 located therebelow by its thickened portion 23, here again a switching action being activated to signal the drive assembly 30.

The trapping protector 1 in accordance with the invention permits due to its appendage 21 of reduced thickness an overlap of the ends 14, 15 of the hollow profile 12 to thus achieve a trapping protector 1 functioning on all sides along the whole length of the trapping protector 1.

We claim:

1. A trapping protector for a power-operated closing device comprising an elongated elastomer hollow profile extending in a longitudinal direction having at least two electrically conductive portions spaced away from each other whose contact triggers a switching action wherein said hollow profile has a first longitudinal end and a second longitudinal end wherein the second end overlaps the first end and wherein at least said first end has a longitudinally extending appendage of less cross-sectional thickness than said hollow profile in which said longitudinal appendage rests on said hollow profile spaced away from said second end.

2. The trapping protector as set forth in claim 1 in which said longitudinally extending appendage is tapered.

3. The trapping protector as set forth in claim 1 in which an upper side of said longitudinally extending appendage is flush with an upper side of said hollow profile.

4. The trapping protector as set forth in claim 3 in said first longitudinal end of said hollow profile comprises a thickened portion.

5. The trapping protector as set forth in claim 4, in which said thickened portion comprises a contact surface area adapted to contact said upper side of said hollow profile.

6. The trapping protector as set forth in claim 1 in which said longitudinally extending appendage is connected to the hollow profile by a region of increased flexibility.

7. The trapping protector as set forth in claim 1 in which said longitudinally extending appendage is attached to one end of said hollow profile.

8. The trapping protector as set forth in claim 1 in which said longitudinally extending appendage has an end facing away from said hollow profile which end comprises a thickened portion.

9. The trapping protector as set forth in claim 1 in which said longitudinally extending appendage has a substantially curved cross-section.

10. The trapping protector as set forth in claim 1, in which a thickened portion of said first end of said hollow profile rests on a contact surface area on said hollow profile spaced away from said second end.

11. The trapping protector as set forth in claim 1 in which said longitudinal appendage has a thickened portion which rests on said hollow profile.

12. The trapping protector as set forth in claim 1 in which a gap is formed between said longitudinal appendage and said hollow profile in a middle portion of said appendage.

* * * * *